(12) United States Patent
Shohfi et al.

(10) Patent No.: US 7,426,693 B2
(45) Date of Patent: Sep. 16, 2008

(54) VISUAL COMMUNICATIONS TOOL

(75) Inventors: Joseph Shohfi, Los Angeles, CA (US); Danette Gorman, Los Angeles, CA (US)

(73) Assignee: Global Apparel Network, Inc., Los Angeles, CA (US)

(*) Notice: Subject to any disclaimer, the term of this patent is extended or adjusted under 35 U.S.C. 154(b) by 573 days.

(21) Appl. No.: 11/053,235

(22) Filed: Feb. 7, 2005

(65) Prior Publication Data

US 2005/0223068 A1   Oct. 6, 2005

Related U.S. Application Data

(63) Continuation-in-part of application No. PCT/US03/24695, filed on Aug. 7, 2003.

(60) Provisional application No. 60/635,808, filed on Dec. 13, 2004, provisional application No. 60/401,806, filed on Aug. 7, 2002.

(51) Int. Cl.
  *G06F 3/00*   (2006.01)
  *G06F 7/00*   (2006.01)
  *G06F 15/16*  (2006.01)
(52) U.S. Cl. .................... 715/751; 715/700; 707/104.1; 709/203; 709/205
(58) Field of Classification Search ................ 715/751, 715/700; 707/104.1, 102; 705/27; 709/203, 709/205
See application file for complete search history.

(56) References Cited

U.S. PATENT DOCUMENTS

| 5,309,555 | A | 5/1994 | Akins et al. |
| 5,515,491 | A | 5/1996 | Bates et al. |
| 5,649,104 | A | 7/1997 | Carleton et al. |
| 5,694,544 | A | 12/1997 | Tanigawa et al. |
| 6,317,722 | B1 | 11/2001 | Jacobi et al. |
| 6,466,918 | B1 | 10/2002 | Spiegel et al. |
| 2002/0040356 | A1 | 4/2002 | Gluck et al. |
| 2002/0049816 | A1 | 4/2002 | Costin, IV et al. |
| 2002/0049847 | A1* | 4/2002 | McArdle et al. ............ 709/227 |
| 2002/0063736 | A1* | 5/2002 | Sugimoto ................... 345/762 |
| 2002/0087601 | A1* | 7/2002 | Anderson et al. .......... 707/515 |
| 2002/0120581 | A1 | 8/2002 | Schiavone et al. |
| 2003/0055711 | A1 | 3/2003 | Doherty |
| 2004/0205494 | A1* | 10/2004 | Bernius et al. ........... 715/501.1 |

OTHER PUBLICATIONS

International Search Report for International Application No. PCT/US03/24695 dated Mar. 25, 2004 (1 page).

* cited by examiner

*Primary Examiner*—Kieu D. Vu
*Assistant Examiner*—Ting Zhou
(74) *Attorney, Agent, or Firm*—Christie, Parker & Hale, LLP.

(57) ABSTRACT

A visual communications (VC) tool creating visual arrangements and presenting the visual arrangements to others for feedback and comment in an efficient and secure manner. An author uses the VC tool to generate a folio, storyboard, or presentation, and publishes the generated arrangement to desired recipients. The published arrangement is uploaded to a server once, and a recipient equipped with a copy of the VC tool downloads the arrangement in response to a notification from the server. Thereafter, only changes to the visual arrangement are uploaded to the server and forwarded to the recipient. The recipient may transmit a comment on the visual arrangement back to the author's VC tool. The author's VC tool tracks and automatically correlates all received comments to their respective arrangements, allowing them to be concurrently displayed on a single screen.

18 Claims, 12 Drawing Sheets

VISUAL COMMUNICATIONS TOOL

CROSS-REFERENCE TO RELATED APPLICATION(S)

This application is a continuation-in-part of International Application No. PCT/US2003/024695, filed on Aug. 7, 2003, which in turn claims the benefit of U.S. Provisional Application No. 60/401,806, filed on Aug. 7, 2002. This application also claims the benefit of U.S. Provisional Application No. 60/635,808, filed on Dec. 13, 2004 , the content of both of which are incorporated herein by reference.

BACKGROUND OF THE INVENTION

People in the fashion and lifestyle-driven industries often struggle to communicate their ideas with each other in an efficient and safe manner. The increase in the usage of electronic communication, such as, for example, electronic mail (e-mail) has somewhat helped their communication efforts. However, traditional e-mail is not catered to the fashion and lifestyle-driven industries where a lot of the information transmitted is visual information, such as pictures. This is because the application generating the pictures is separate from the e-mail application used for their transmission. Thus, the pictures are generally transmitted by the e-mail application in the form of an attachment.

The use of e-mails with attachments is undesirable for various reasons. First, any comment in the body of the e-mail about an attached image is separate from the attachment itself. This makes it difficult to maintain multiple comments received about the image correlated and organized with the image. Furthermore, people receiving an image attachment and responding with a comment on the image may not reattach the image to the responding e-mail, leaving it to the recipient to figure out which images go with which e-mails.

Second, some company networks do not allow employees to receive e-mails that contain attachments. Employees in such situations may have to utilize other mechanisms for receiving the attachments to which comments are desired.

Third, when changes are made to a presentation, it must generally be reattached to an e-mail and retransmitted to ensure that all recipient have the latest version of the presentation. During a development phase where there may be constant feedback and modification to the presentation, such retransmission of attachments puts a strain on a company's bandwidth.

Finally, there is currently no mechanism to prevent a person receiving a picture in the form of an attachment from reproducing and forwarding the attachment to others. Thus, the author of the picture runs a risk that this or her copyright rights for the picture may be violated by providing the picture in an attachment.

Current e-mail technology, even without attachments, also does not provide an efficient way to track comments about a given topic. A receiving person needs to make sure that the most recent e-mail about the topic is opened to make sure that he or she has the most recent comments. Also, when comments are transmitted concurrently by different people, the recipient generally has to open multiple e-mails to make sure that all of the comments are reviewed.

Traditional electronic mail, therefore, is difficult and frustrating to use for designers, suppliers, and retailers in the fashion and lifestyle-driven industries. Accordingly, what is desired is a visual communications tool catered to the fashion and lifestyle-driven industries where a majority of the information being communicated is visual information, and where there is constant feedback about the visual information that needs to be tracked and correlated to the visual information.

SUMMARY OF THE INVENTION

A visual communications (VC) tool creating visual arrangements and presenting the visual arrangements to others for feedback and comment in an efficient and secure manner.

According to one embodiment, the present invention is directed to a visual communications method that includes generating a visual arrangement including an image, and storing the visual arrangement in a computer data store. A comment is received on at least a portion of the visual arrangement over an electronic data communications medium, and the comment automatically correlated to the portion of the visual arrangement. The portion of the visual arrangement with the correlated comment is then displayed on a display.

According to another embodiment, the present invention is directed to a visual communications method that includes receiving a notification on a published visual arrangement including an image, responding to the notification with a comment on at least a portion of the visual arrangement, and transmitting the comment over an electronic data communications medium. The comment includes a reference to the portion of the visual arrangement to which the comment relates. The reference is used by a device receiving the comment to correlate the received comment to a corresponding portion of the visual arrangement stored in the device's local data store.

According to a further embodiment, the present invention is directed to a visual communications tool that includes a first display area displaying a visual arrangement including an image, and a second display area displaying textual information associated with the visual arrangement. The visual communications tool executes program instructions which allows the visual arrangement to be correlated to the textual information. The visual communications tool also executes program instructions which automatically displays the visual arrangement and the textual information in their respective display areas in response to a user command.

These and other features, aspects and advantages of the present invention will be more fully understood when considered with respect to the following detailed description, appended claims, and accompanying drawings. Of course, the actual scope of the invention is defined by the appended claims.

DETAILED DESCRIPTION

The various embodiments of the present invention are directed to a visual communications tool for creating visual arrangements and presenting the visual arrangements to others for feedback and comment in an efficient and secure manner. The comments received for the visual arrangements are tracked and automatically correlated to the arrangements, allowing them to be concurrently displayed on a single screen, using a single application.

Figure 1:
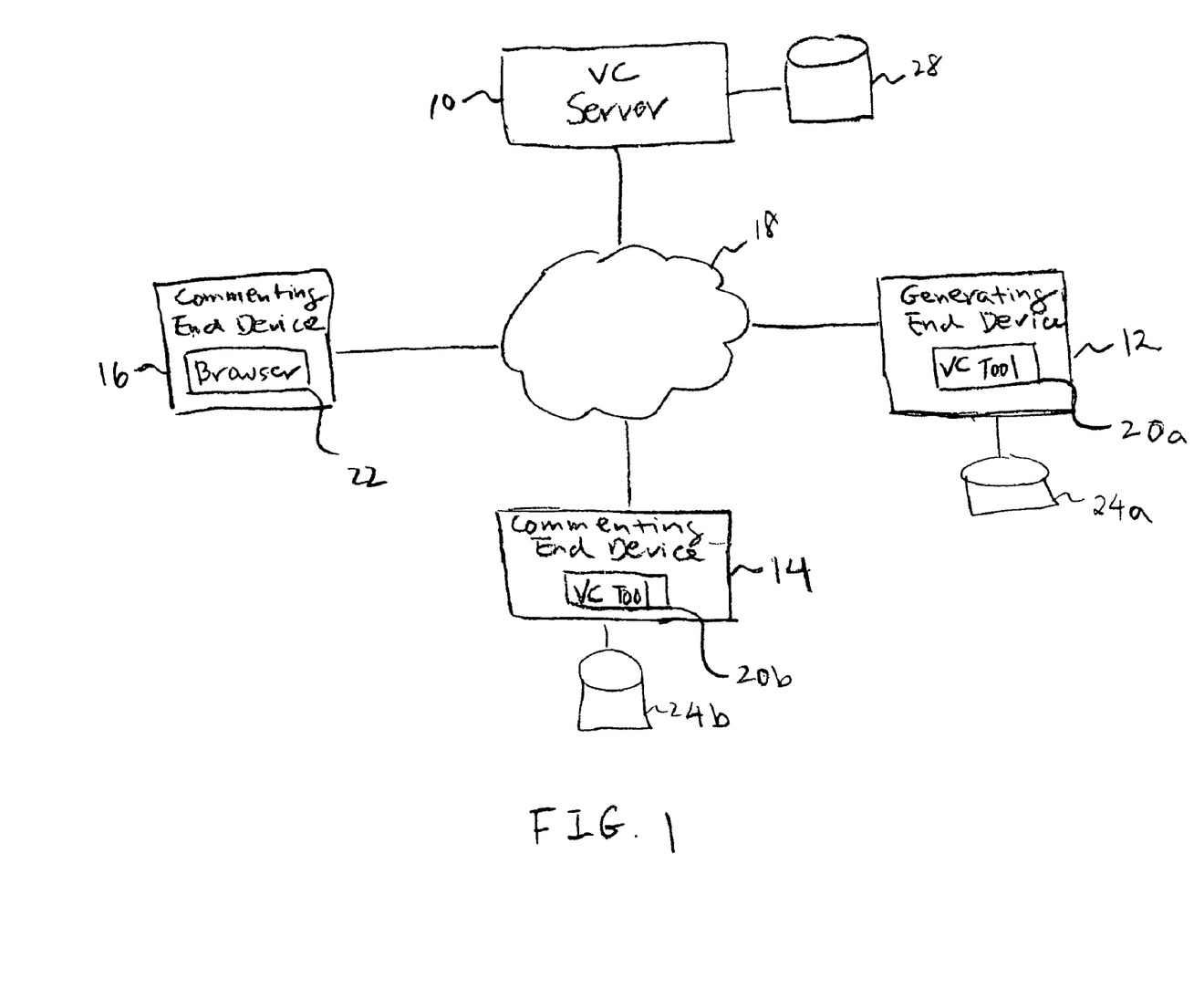
FIG. 1 is a block diagram of a visual communications system according to one embodiment of the invention.

FIG. 1 is a block diagram of a visual communications system according to one embodiment of the invention. The system includes a visual communications (VC) server 10 coupled to various end devices 12, 14, 16, over a data communications network 18. The data communications network may be a local area network, a private wide area network, public wide area network (e.g. the Internet), and the like, implemented via one or more known wired or wireless solutions. The end devices 12, 14, 16 may take the form of a personal computer, laptop, or consumer electronics device, or the like.

According to one embodiment of the invention, a generating end device 12 includes a VC tool 20*a* used for generating a visual arrangement and storing the visual arrangement in a local data store 24*a*. The generating end device 12 may obtain the VC tool 20 in any manner conventional in the art, such as, for example, by downloading the tool from the VC server 10. The generating end device 12 uses the VC tool 20 to further publish the generated visual arrangement to commenting end devices 14 and 16.

According to one embodiment of the invention, the commenting end device 14 also includes a copy of the VC tool 20*b* which is used to view the arrangement transmitted by the generating and device 12. If allowed by the generating end device 12, the images in the visual arrangement may be stored in the commenting end device's data store 24*b*, and reused in generating other visual arrangements via the VC tool 20*b*. The commenting end device 14 may further use the VC tool 20*b* to generate and transmit comments with respect to the arrangement. The comments may be transmitted to only the generating end device 12, or to both the generating end device and another commenting end device 16.

A commenting device need not include the VC tool to view and comment on a presented visual arrangement. For example, the commenting end device 16 may still view and comment on the arrangement even without the VC tool. This may be done, for example, via a web browser 22 or like software application used to access the VC server 10 and retrieve a web page of the visual arrangement. The VC server 10 provides an interface on the web page allowing the commenting end device 16 to add comments for the presented visual arrangement. The comments may be transmitted to only the generating end device 12, or to both the generating end device and the other commenting end device 14.

The images included in the visual arrangement may not be copied or re-used by the commenting end device 16 given that it is not equipped with a copy of the VC tool. Even with the VC tool, a commenting end device such as end device 14 may not copy or re-use the images unless the images are transmitted to the end device 14 in a "shared" mode.

According to one embodiment of the invention, all communication between the end devices 12, 14, 16 occur under the control of the VC server 10. According to one embodiment, all information associated with a new visual arrangement that is to be published to the commenting end device 14 and/or 16 is initially uploaded to the VC server 10 and stored in a central data store 28. A first time recipient of the visual arrangement equipped with a copy of the VC tool, such as the end device 14, initially downloads the images in the visual arrangement in its own local data store, such as data store 24*b*. Thereafter, if the recipient desires to transmit a comment on the visual arrangement back to the creating author, only the comment is transmitted to the VC server 10 along with a link or reference to the corresponding visual arrangement. The VC server 10 then forwards the comment and the link/reference to the author. According to one embodiment of the invention, the VC server 10 maintains a copy of the received comment in the central data store 28.

It should be appreciated that the actual images in the visual arrangement are not retransmitted after the initial uploading and downloading to the recipient(s). If, however, changes are made to the images included in the visual arrangement, the changed images are uploaded to the VC server 10 for updating the arrangement in the central data store 28, and the changed images then forwarded to the recipient(s) equipped with the VC tool.

Figure 2:
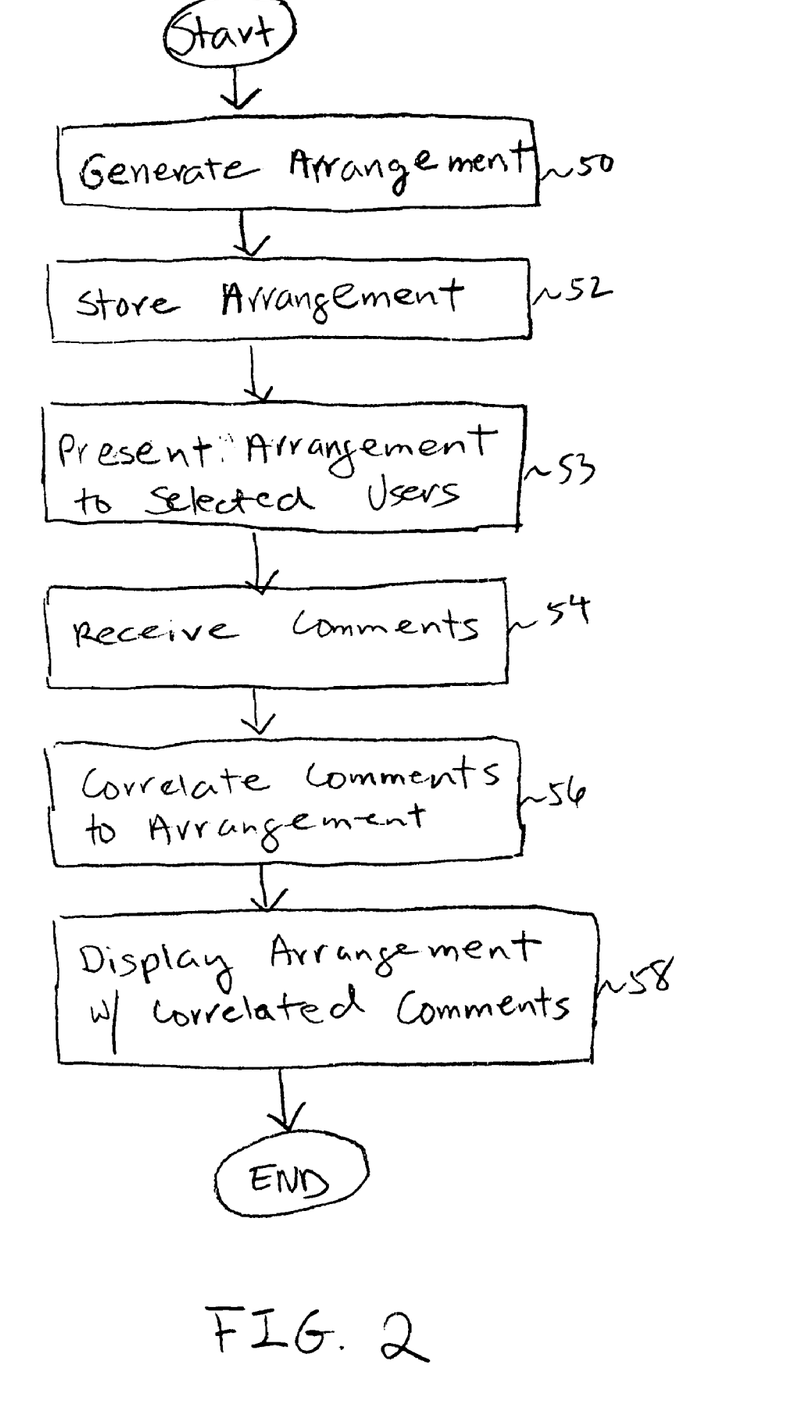
FIG. 2 is a flow diagram of a process implemented by a visual communications (VC) tool according to one embodiment of the invention.

FIG. 2 is a flow diagram of a process implemented by the visual communications (VC) tool 20*a* according to one embodiment of the invention. In step 50, the VC tool 20*a* generates a visual arrangement, and in step 52, stores the visual arrangement in the local data store 24*a*. The visual arrangement may be, for example, a folio organizing different types of pictures, sketches, swatches, and colors. The visual arrangement may also be a storyboard providing a collage of pictures, shapes, annotation, and text, for visualizing concepts and ideas. The visual arrangement may further be a slide show of pictures, folios, or storyboards, for communicating concepts and ideas in an organized manner.

Once generated, the visual arrangement is, in step 53, presented or published to the commenting end device 14 and/or 16 as desired by the author. In this regard, all information associated with the visual arrangement, including all images, descriptions, and comments, hereinafter simply referred to as the visual arrangement, are initially uploaded by the VC tool 20*a* to the VC server 10. The uploaded information is stored in the central data store 28, and a link or reference generated for the visual arrangement.

The VC server 10 then publishes the visual arrangement to the commenting end devices 14 and/or 16. The initial publication of the visual arrangement to the commenting end device 14 with the VC tool 20*b* involves the actual downloading of the arrangement by the commenting end device 14. The publication of the visual arrangement to the commenting end device 16 without the VC tool involves the transmission of a link to a web page generated for the visual arrangement. In either case, the recipient receives a notification that the visual arrangement has been published.

The users of the commenting end devices 14, 16 review the visual arrangement and provide comments in response. The comments are then received by the generating end device 12 in step 54. The comments from the commenting end device 14 include a reference to the portion of the visual arrangement to which the comment relates, but does not include the actual images in the visual arrangement. The comments and the link to the relevant portion of the visual arrangement are received by the VC server 10 and forwarded to the appropriate recipients.

In step 56, the VC tool 20a correlates a received comment to a relevant portion of a corresponding visual arrangement in the local data store 24a. The relevant portion of the corresponding visual arrangement may be identified via the link or reference that is transmitted with the comment. The identified visual arrangement is then updated based on the received comment.

In step 58, the VC tool 20a displays the visual arrangement with the correlated comment in response to a user command. The user command may be, for example, a single user action which opens a notification in the user's inbox that a comment has arrived.

The process described with respect to FIG. 2 allow comments to be kept together with the visual arrangement to which the comments are directed. Furthermore, the user need not manipulate different programs for concurrently viewing the visual arrangement and the associated comments. In addition, bandwidth savings may be achieved by avoiding constant retransmission of the images in the visual arrangement.

Figure 3:
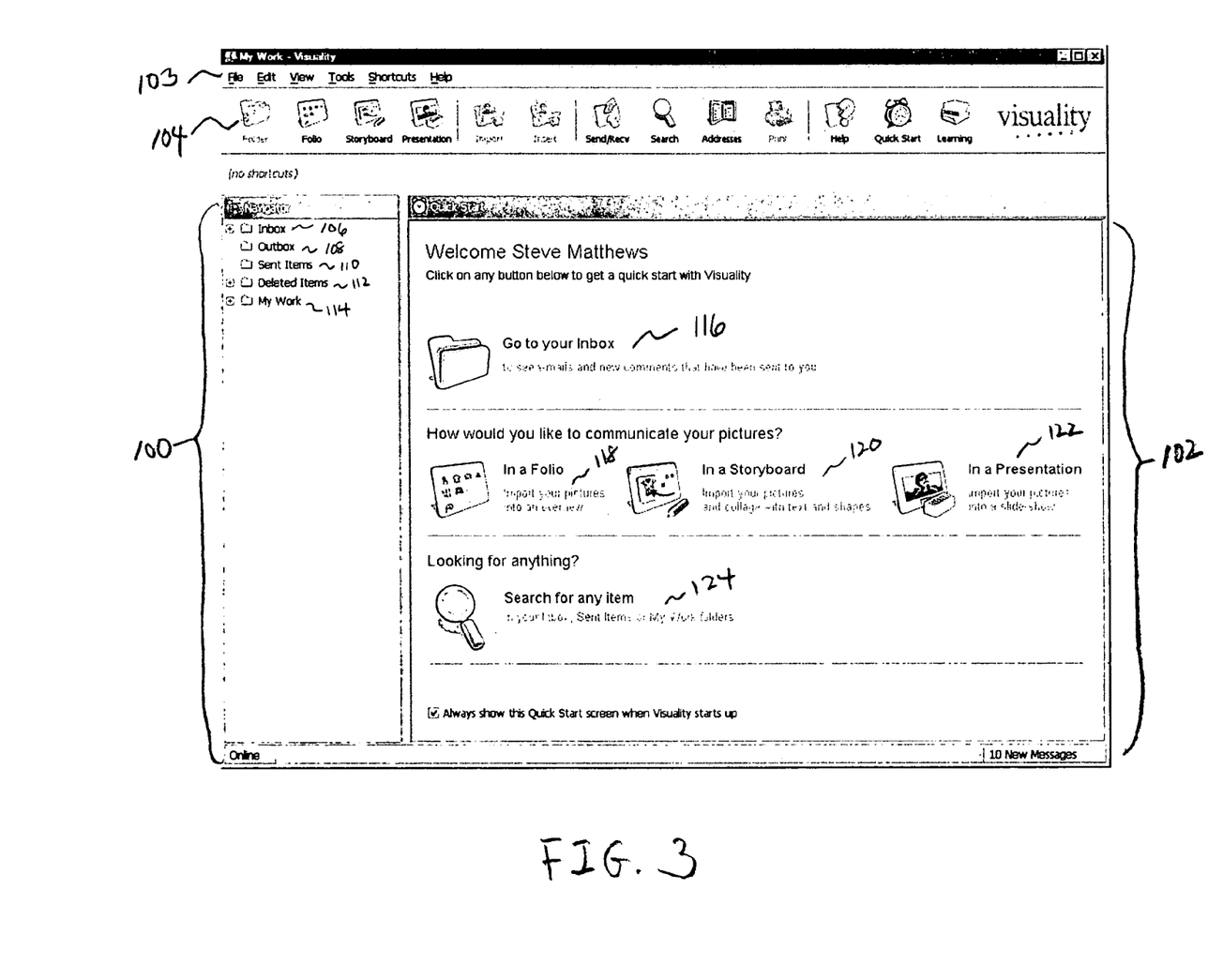
FIG. 3 is a screen shot of a graphical user interface provided by the VC tool of FIG. 2 according to one embodiment of the invention.

FIG. 3 is a screen shot of a graphical user interface provided by the VC tool 20a, 20b (collectively referred to as 20), according to one embodiment of the invention. The interface includes a navigator area 100, work area 102, menu bar 103, and main tool bar 104. The navigator area 100 includes a work folder 114 for storing imported pictures and visual arrangements generated by the author using the VC tool.

The navigator area 100 further includes an inbox folder 106, an outbox folder 108, a sent items folder 110, and a deleted items folder 112. The inbox folder 106 stores notifications that arrangements or comments have been published. The outbox folder 108 stores copies of arrangements or comments that are to be published by the VC tool 20, but have not yet been delivered to the VC server 10 due to, for example, a lack of connection to the server. The sent items folder 108 stores information on the visual arrangements and notifications that have been published by the VC tool 20. The deleted items folder 112 stores all pictures, arrangements, and notifications deleted by the VC tool. According to one embodiment of the invention, the various folders 106-112 may be integrated with similar folders used in typical e-mail application, such as, for example, Microsoft Outlooks™.

The menu bar 103 contains menu items for accessing the various features provided by the VC tool 20. The more common tasks, such as, for example, the creating, opening, and editing of different types of visual arrangements, importing of pictures, sending/receiving of information related to the visual arrangements, and the like, may be accessed via one or more buttons incorporated into a main tool bar 104.

According to one embodiment of the invention, the work area 102 displays a quick start page when the VC tool is invoked. The quick start page provides the user with the following options: (1) option to view the contents in the inbox folder 116; (2) option to create a folio 118; (3) option to create a storyboard 120; (4) option to create a presentation 122; and (3) option to search 124 for an item in one of the folders listed in the navigator area.

Figure 4:
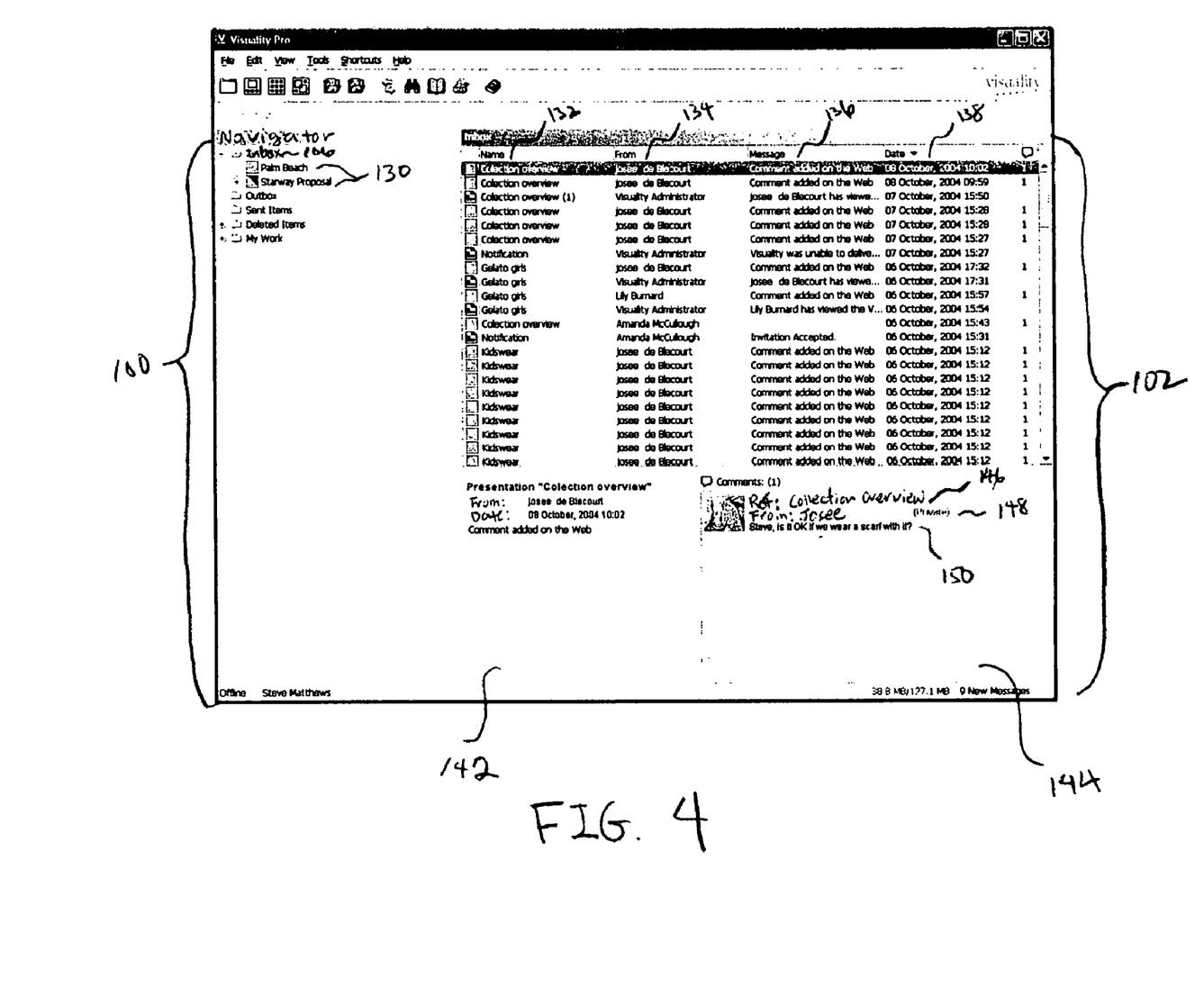
FIG. 4 is a screen shot of updated navigator and work areas upon user selection of an inbox folder according to one embodiment of the invention.

FIG. 4 is a screen shot of the updated navigator and work areas 100, 102 upon user selection of the inbox folder 106 according to one embodiment of the invention. The navigator area 100 is updated to include a list of the visual arrangements 130 that have been published to the VC tool by others.

The work area 102 is updated to include information on notifications received by the VC tool 20. According to one embodiment of the invention, the VC tool periodically contacts the VC server 10 for any new notifications while the VC tool is connected to the data communications network 18. Such notifications may include a name for the notification 132, a sender of the notification 134, a portion of the message 136, and a date 138. According to one embodiment of the invention, the name 132 identifies a visual arrangement if the notification is linked to the visual arrangement.

If the notification is not linked to a visual arrangement, it is simply a textual notification identified by a generic name. For example, the textual notification may be an invitation transmitted by the VC server 10 prior to publishing an arrangement to the VC tool for the first time. The invitation invites the user to accept or decline receipt of the arrangement.

According to one embodiment of the invention, a first type of selection of a notification (e.g. highlighting the notification) causes the display of a message that is delivered with the notification, on a portion 142 of the work area 102. The message may be a personal message provided by the sender, or a default message provided by the VC server 10. A default message may provide information, for example, as to when and who has viewed the visual arrangement published by the VC tool 20.

If the notification is for a published comment, the first type of selection of the notification further displays the text of the comment 150 on another portion 144 of the work area 102. Also displayed is a reference 146 to the portion of the visual arrangement to which the comment relates, and the person 148 publishing the comment. The reference 146 may be the name of the portion of the visual arrangement and/or one or more thumbnails of images to which the comment relates.

Figure 5:
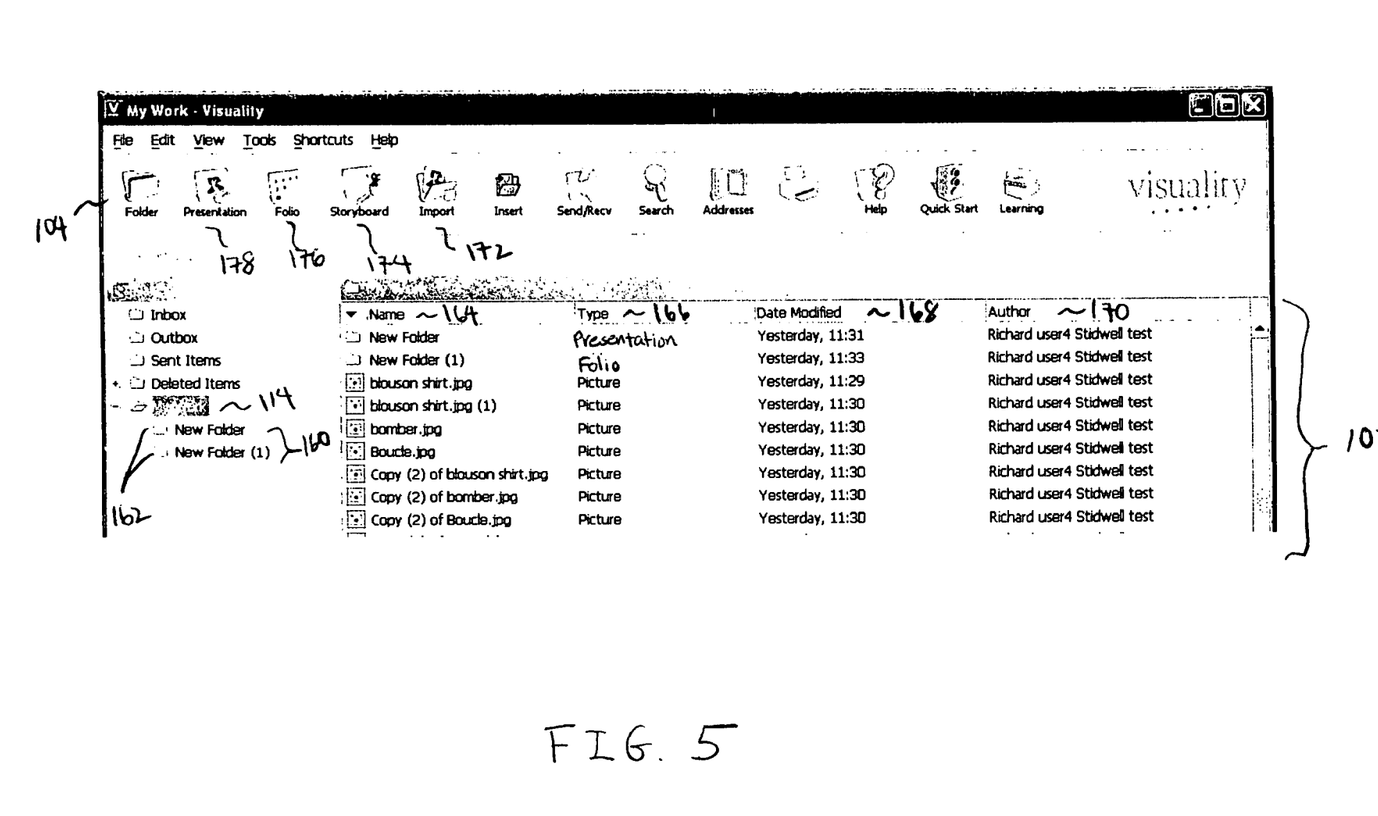
FIG. 5 is a screen shot of updated navigator and work areas upon user selection of a work folder according to one embodiment of the invention.

FIG. 5 is a screen shot of the updated navigator area 100 and work area 102 upon user selection of the work folder 114 according to one embodiment of the invention. The navigator area 100 is updated to include a list of folders 160 containing the visual arrangement generated via the VC tool 20. The name of each folder may indicate the name of the visual arrangement. Furthermore, different icons 162 may be used to easily identify the type of visual arrangement (e.g. a folio, storyboard, or presentation).

The work area 102 is updated to include information on current work stored in the local data store 24a, 24b (collectively referred to as 24). Such information includes, for example, a name 164 of the work, a type 166 of work, date 168 in which the work was modified, and an author 170 of the work.

According to one embodiment of the invention, only pictures that have been imported into the VC tool, or included in a visual arrangement shared with the VC tool may be used by the VC tool for generating the visual arrangements. A picture may be imported into the work folder 114 directly upon selection of an import button 172 from the main tool bar 104. Pictures may also be imported at any time during the creation of a visual arrangement. In this case, the pictures are imported directly in the particular folder 160 storing the visual arrangement. Selection of a particular folder causes the work area 102 to display a list of pictures and/or other visual arrangements included in the folder.

A user command to import a picture causes a display of a browser that the author may use to browse and select different picture files that are to be imported into the VC tool 20. According to one embodiment of the invention, the tool allows the importing of all types of images, including JPEG, GIF, PNG, TIFF, and PDF files. According to one embodiment of the invention, PDF files are first converted to JPEG images before importing into the VC tool. To get around the problem of low quality printouts from JPEG images converted from a PDF file, the VC tool provides a zoom option that allows the JPEG images to be viewed in more detail.

Figure 6:
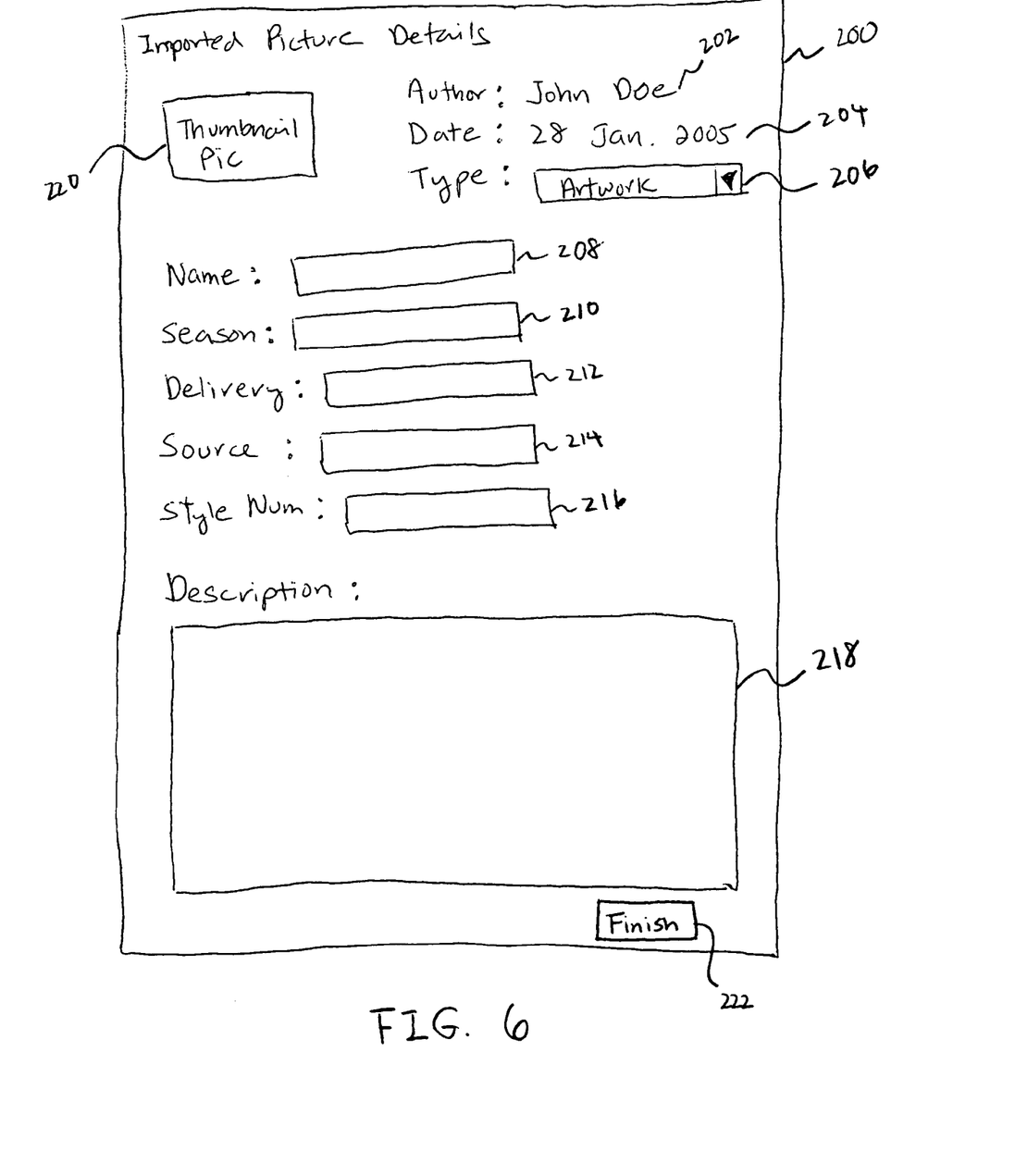
FIG. 6 is a screen shot of a picture information window according to one embodiment of the invention.

The author may provide additional information about the picture during the importing process. FIG. 6 is a screen shot of a picture information window 200 displayed during the importing process for allowing the author to provide information on an imported picture according to one embodiment of the invention. The picture information window 200 includes a thumbnail 220 of the picture, an author 202, and a current date 204, and prompts the user for a picture type 206, name 208, season 210, delivery 212, source 214, and/or style number 216 information. The user may further provide a free-text description of the picture in a description area 218. Selection of a finish button 222 causes the entered information to be stored in the local data store 24 in association with the picture.

Figure 7:
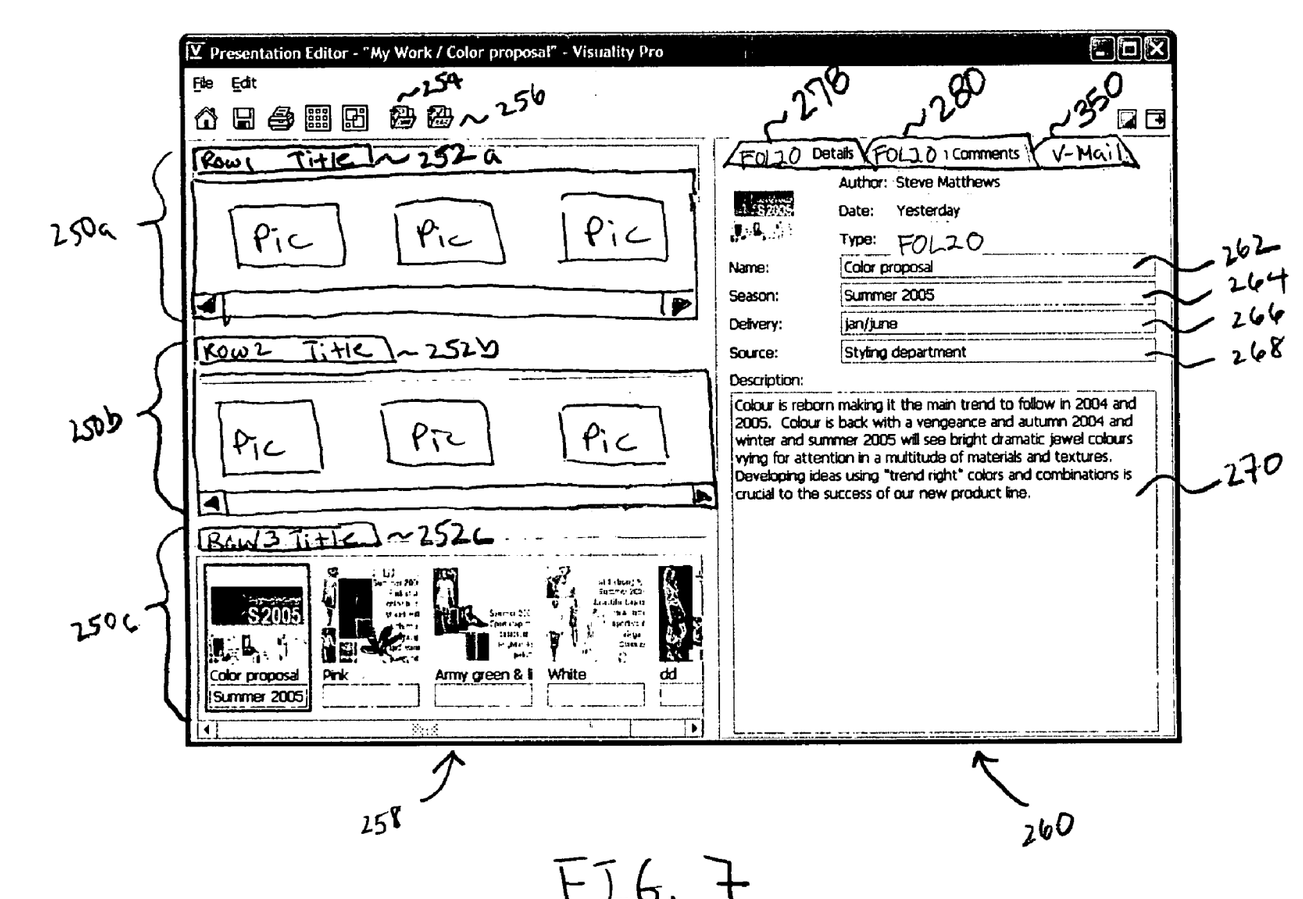
FIG. 7 is a screen shot of a folio generated by the VC tool of FIG. 2 according to one embodiment of the invention.

FIG. 7 is a screen shot of a folio generated by the VC tool 20 according to one embodiment of the invention. A new folio may be generated, for example, upon the selection of a folio button 176 (FIG. 5) from the main tool bar 104. Pictures may then imported into the folio by selecting an import button 254. Other visual arrangements (e.g. storyboards), pictures that have already been imported, or all or portions of visual arrangements shared by others may also be included in the folio by selecting an insert button 256.

Thumbnails of pictures included into the folio are displayed in a picture area 258 of the screen, and details about the folio or individual pictures in the folio are concurrently displayed in a details area 260 of the screen. The picture area 258 includes one or more rows 250a, 250b, 250c with each row identified by a user-entered row label 252a, 252b, 252c. The rows may be used, for example, to organize the picture thumbnails into particular categories. The pictures may be re-organized by clicking and dragging the pictures from one row to another. A new row may further be generated by clicking and dragging a picture into the picture area below the last row. The picture is then inserted into the newly generated row.

Double clicking on a particular thumbnail allows the associated picture to be displayed on a separate window in a picture editing mode. From this window, the author may crop, resize, rotate, and otherwise manipulate the picture. If the changes are saved, the changes are reflected in the picture thumbnail.

The details area 260 provides detailed information on the entire folio or individual pictures included into the folio. In the example screen shot of FIG. 7, the details area 260 displays detailed information on the entire folio under a folio details tab 278. Such details are provided by the user of the VC tool 20, and may include a name of the folio 262 as well as season 264, delivery 266, and source 268 information. The user may further provide a detailed description of the folio in a folio description section 270.

A user may also add or view comments with respect to the folio by selecting a folio comments tab 280. The feature of adding and viewing comments is described in further detail below with respect to FIG. 9. The user may then transmit the comments by selecting a mail tab 350. The mail feature is described in further detail below with respect to FIGS. 10 and 11.

As the user navigates from thumbnail to thumbnail, the user-entered picture information relevant to the selected thumbnail is displayed on the details area 260. The folio details tab 278 and the folio comments tab 280 are respectively replaced with a picture details tab (not shown) and a picture comments tab (not shown) when displaying picture details. The format of the picture details and comments may be same as the folio details and comments. In this manner, visual arrangements/pictures and the textual information describing such arrangements/pictures may be maintained together and concurrently displayed on a single screen.

The picture and details area 258, 260 contain similar information for other visual arrangements, such as a storyboard or presentation. The picture area 258 for a storyboard or presentation includes pictures or other visual arrangements included into the storyboard or presentation, and the details area 260 includes details on the storyboard or presentation. Furthermore, clicking on a particular picture or visual arrangement included into the storyboard or presentation causes details on the individual picture or arrangement to be displayed in the details area 260.

Figure 8:
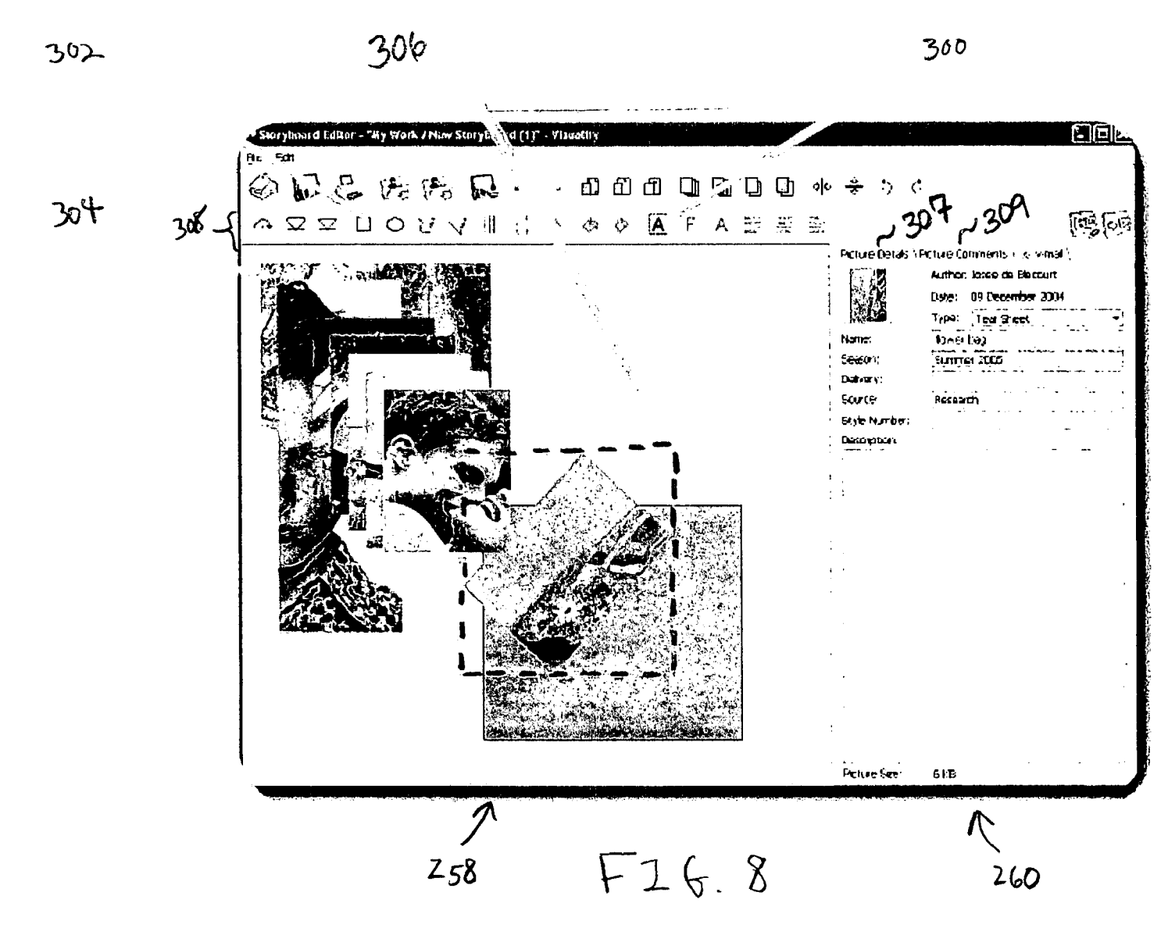
FIG. 8 is a screen shot of an exemplary storyboard generated by the VC tool of FIG. 2 according to one embodiment of the invention.

FIG. 8 is a screen shot of an exemplary storyboard according to one embodiment of the invention. A new storyboard may be generated, for example, upon the selection of a storyboard button 174 (FIG. 5) from the main tool bar 104. A storyboard may be used to combine and edit pictures for generating mood boards, product groups, fabric collections, and the like. As with a folio, pictures may be imported or inserted into the picture area 258. Unlike a folio, however, the pictures are not inserted into rows. Instead, a picture is first inserted into a corner 304 of the picture area, and may then be clicked and dragged to a new desired location within the picture area.

Clicking on a particular picture also displays the picture's boundary line 306, and may be manipulated to resize, rotate, or crop the picture. Text and shapes may also be inserted into the picture area 258 upon selection of text and shape icons 300, 302 in a secondary tool bar 308.

Clicking on a particular picture further causes the details area 260 to switch from displaying storyboard details to displaying details of the selected picture under a picture details tab 307. Comments on the selected picture may be viewed or added by selecting a picture comments tab 309.

Figure 9:
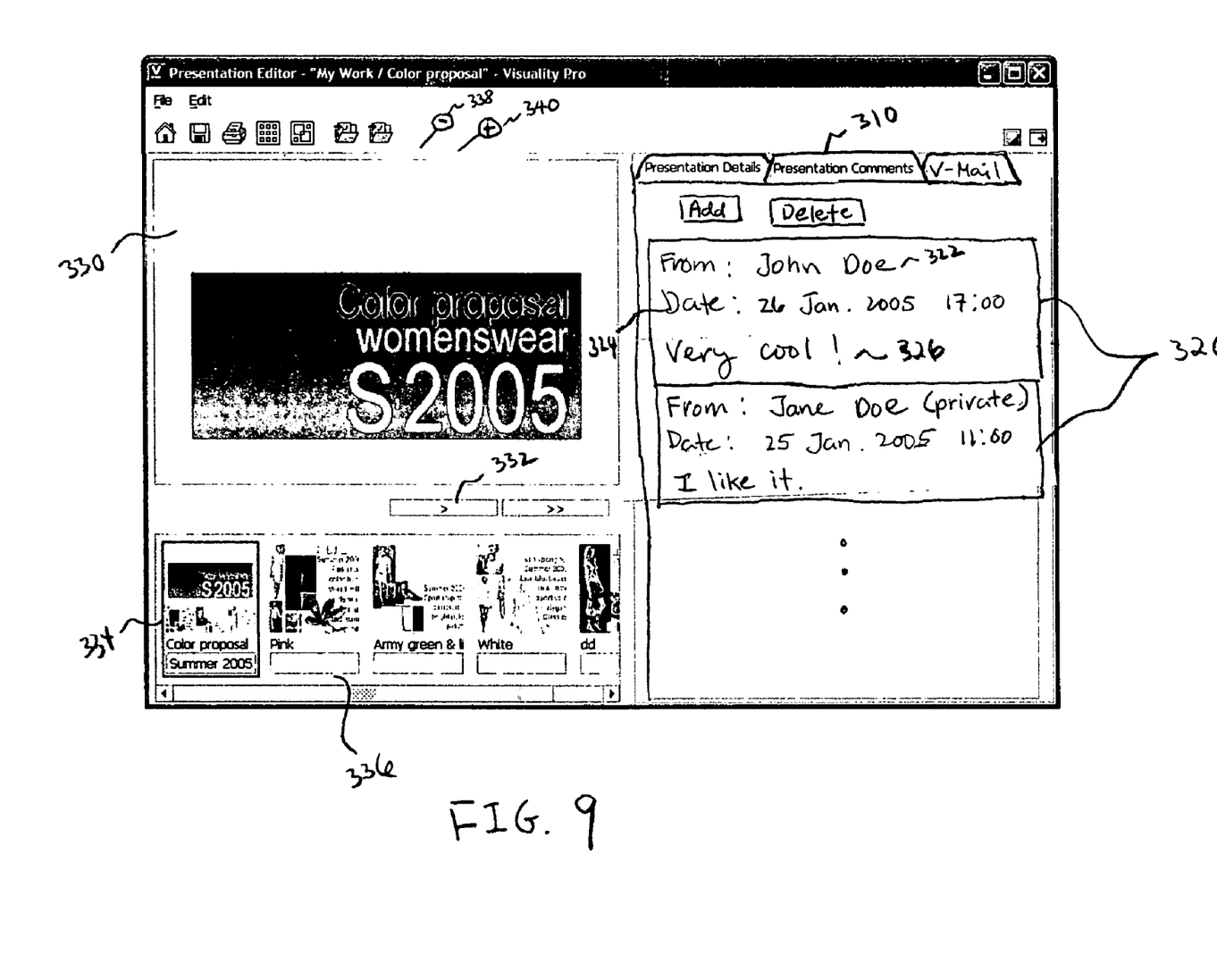
FIG. 9 is a screen shot of an exemplary presentation according to one embodiment of the invention.

FIG. 9 is a screen shot of an exemplary presentation according to one embodiment of the invention. A new presentation may be generated, for example, upon the selection of a presentation button 178 (FIG. 5) from the main tool bar 104. A presentation allows the author to generate a slideshow of pictures, folios, or storyboards that have been imported or inserted into the presentation. The slideshow is displayed on a slideshow area 330, and may include a customized cover page picture 334 and other pictures/arrangements 336 that have been imported or inserted into the presentation. An import cover page option allows the importing of a cover page. Unlike the importing of other pictures, importing of a cover page does not require detailed information about the cover page picture.

A viewer may move forward on the slideshow by selecting a forward button 332. Furthermore, view editors 338, 340 may be manipulated to zoom in and out of the pictures displayed on the slideshow area 330.

Selection of a presentation comments tab 310 allows the author to view, add, or delete comments 320 on the entire slideshow. Each comment includes information on the person 322 making the comment, the date and time 324 in which the comment was added 324, and the text 326 of the comment itself. A private comment directed to only the author is marked with a "private" label. Similar information is provided for comments provided for individual pictures upon the selection of a picture and a corresponding picture comments tab, such as, for example, the picture comments tab 309 of FIG. 8.

It should be appreciated that the comments 320 that are displayed, if not added by the user of the VC tool 20, are comments that have been transmitted by others in notifications received by the VC tool and stored in the inbox folder 106. As discussed above, such notifications do not include the actual picture or arrangement to which the comment relates, but a link to the picture or arrangement, allowing the VC tool to automatically associate the received comment to the corresponding picture or arrangement. Upon selection of the presentation comments tab 310, the VC tool automatically retrieves all comments that have been correlated to the current presentation and concurrently displays such comments on a single screen with the corresponding images.

Figure 10:
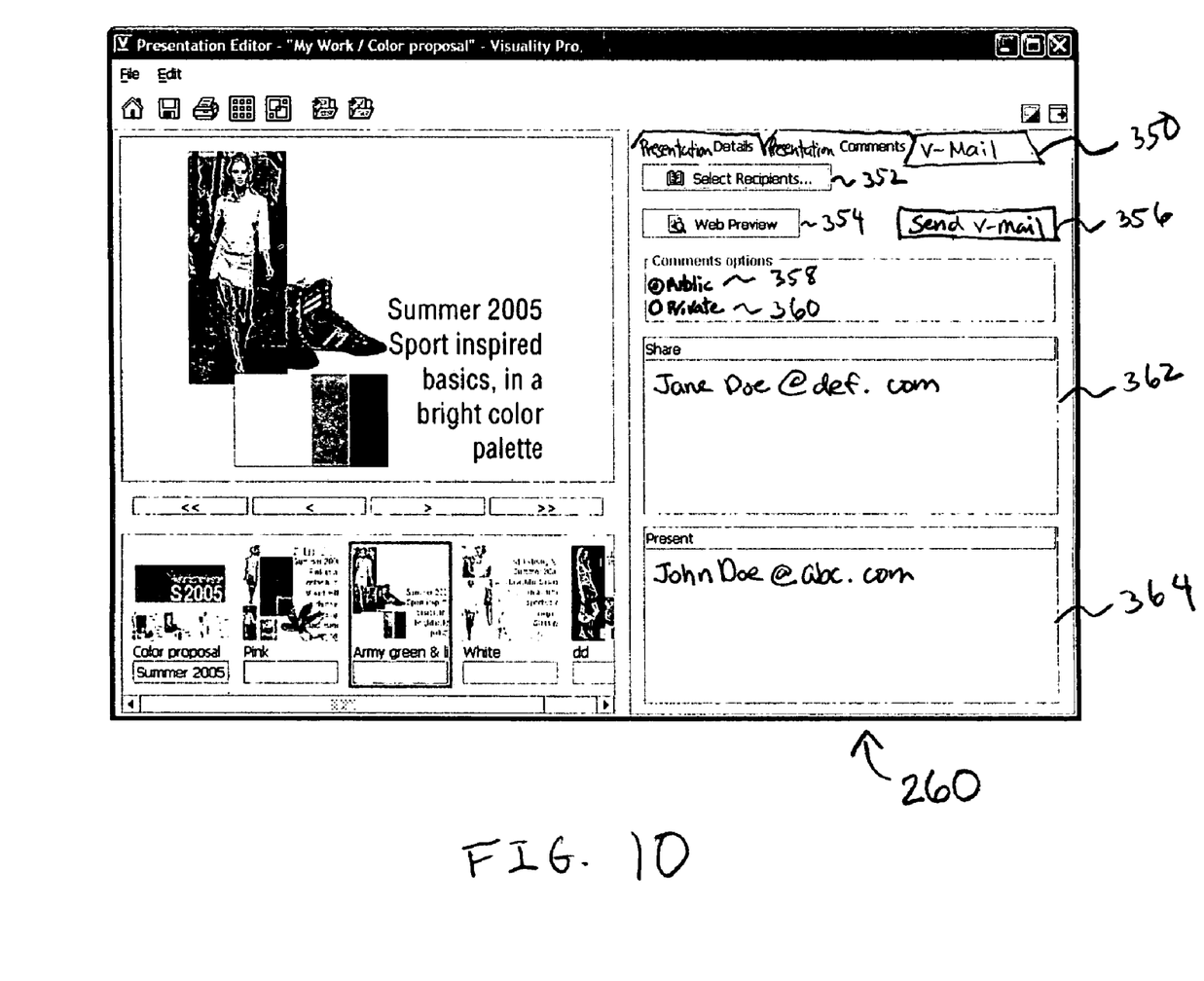
FIG. 10 is a screen shot of information displayed on a details area upon selection of a mail tab according to one embodiment of the invention.

The user of the VC tool 20 may make changes to a current visual arrangement, such as, for example, by changing the images, descriptions, or comments in the arrangement, and publish the modified arrangement to one or more recipients via a mail feature invoked upon selecting the mail tab 350. FIG. 10 is a screen shot of information displayed on the details area 260 upon selection of the mail tab 350 according to one embodiment of the invention.

Figure 11:
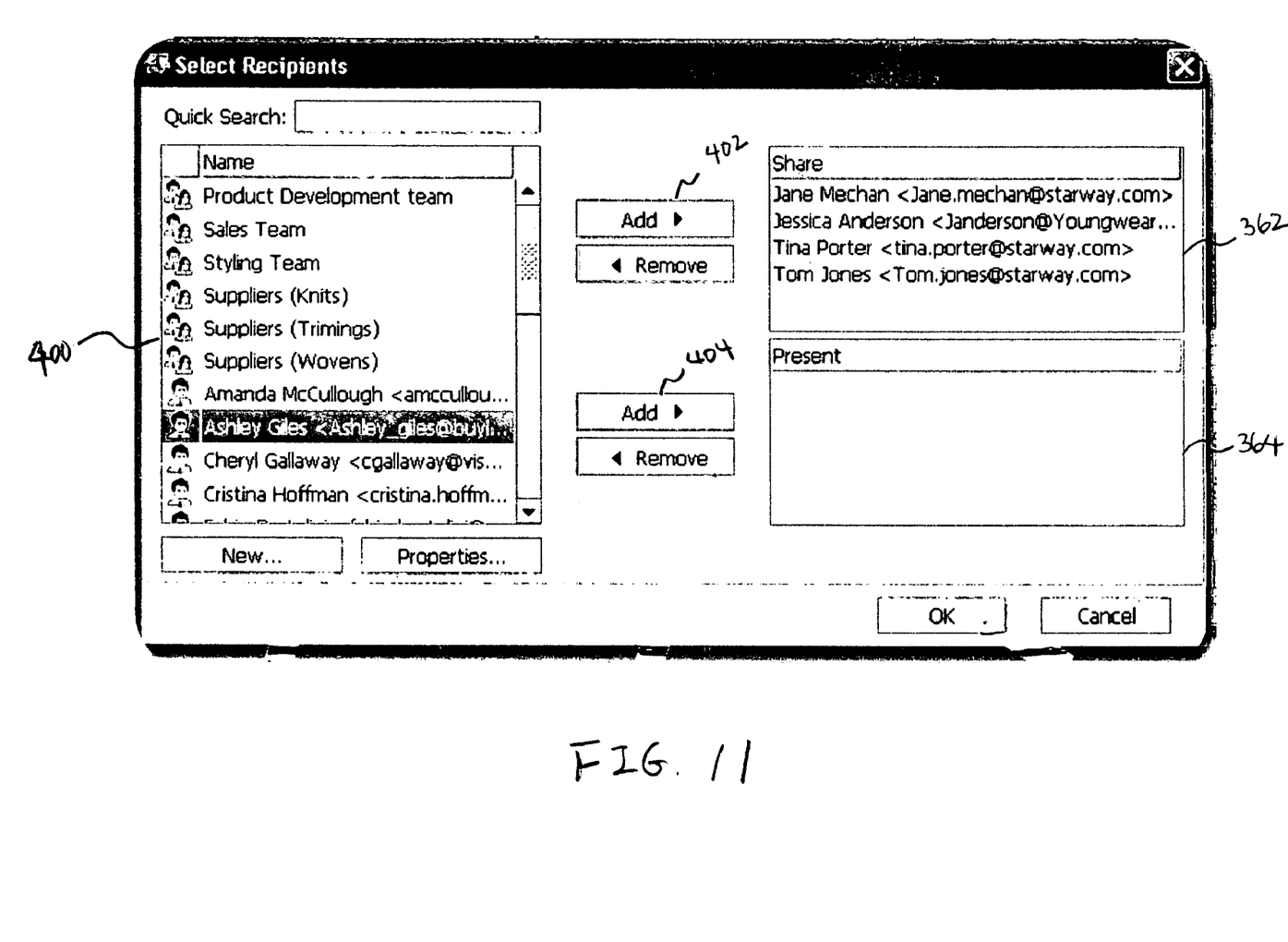
FIG. 11 is a screen shot of a contacts window according to one embodiment of the invention.

A selection recipients option 352 causes display of all contact information maintained by the VC tool in a separate contacts window, such as the window displayed on FIG. 11. The user of the VC tool 20 selects a desired recipient from a list of contacts 400, and adds the recipient to a share list 362 upon selecting add button 402, or to a present list 364 upon selecting add button 404. The recipients in the share list 362 may copy and re-use the pictures and arrangements published to such recipients, in their own work. According to one embodiment of the invention, only other VC tool users may be included as share recipients.

The recipients in the present list 364 may view and respond with comments, but may not copy the published pictures. Any person with an e-mail account may be included as a recipient in the present list. Such persons need not be VC tool users.

According to one embodiment of the invention, the author of the visual arrangement may set a comment preference as public 358 or private 360. Selection of the public preference causes response comments to be sent to all the recipients identified by the author. Selection of the private preference causes response comments to be only sent back to the author.

Prior to making a publication to a non-VC tool recipient who is to view the publication as a web page, the author may select a web preview icon 354 and receive a link to the web page in an e-mail to the author's e-mail account. Selection of the link allows the author to view the web page as it would be viewed by the non-VC tool recipient.

Once the author is ready to publish the visual arrangement or comments in response to a published visual arrangement, the author selects a send button 356. In response, the VC tool causes display of separate message window where the author may enter an optional message to be provided in the notification delivered to the VC tool recipient, or in the e-mail delivered to the non-VC tool recipient.

After entry of the optional message, the VC tool 20 stores a copy of the information to be published in the outbox folder 108 if the VC tool is in an offline mode, and transmits it the next time a connection is made to the VC server 10. If the VC tool is in an online mode, the information to be published is uploaded to the VC server 10 for presenting to the recipients.

Figure 12:
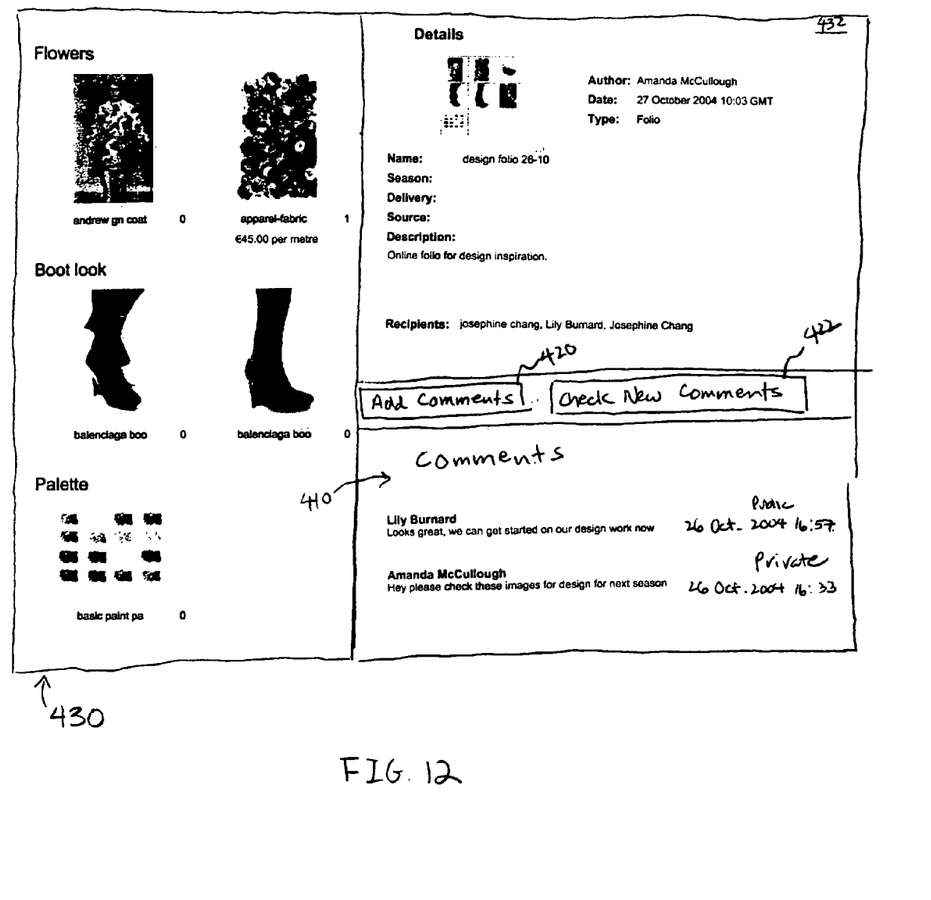
FIG. 12 is an exemplary web page accessed by a non-VC tool recipient according to one embodiment of the invention.

FIG. 12 is an exemplary web page accessed by a non-VC tool recipient according to one embodiment of the invention. The web page is accessed via a link provided by the VC server 10 in an e-mail addressed to the recipient's e-mail account. Upon selection of the link, the recipient may view the web page via the recipient's web browser, such as the web browser 22 of FIG. 1.

The web page displays the published images in a pictures area 430. Details on the images are displayed on a details area 432, and comments associated with the images displayed in a comments area 410. The recipient may add new comments by selecting an add comments button 420, or check for new comments by selecting a check new comments button 422.

Selection of the add comments button 420 causes display of a separate comments window (not shown) where the user may enter his or her comments and further select whether the entered comments are to be delivered to only the publishing author, or to all recipients designated by the publishing author.

While certain exemplary embodiments have been described above in detail and shown in the accompanying drawings, it is to be understood that such embodiments are merely illustrative of and not restrictive of the broad invention. In particular, it should be recognized that the teachings of the invention apply to a wide variety of systems and processes. For example, the various embodiments of the present invention may be extended to systems and processes outside the fashion and lifestyle-driven industries. Furthermore, although the visual arrangements are described with respect to still images and pictures, a person of skill in the art should recognize that the visual arrangements may take the form of any multimedia presentation or arrangement conventional in the art. The comments may also not be limited to text comments, but may also extend to audio comments and the like. It will thus be recognized that various modifications may be made to the illustrated and other embodiments of the invention described above, without departing from the broad inventive scope thereof. In view of the above it will be understood that the invention is not limited to the particular embodiments or arrangements disclosed, but is rather intended to cover any changes, adaptations or modifications which are within the scope and spirit of the invention as defined by the appended claims and their equivalents.

What is claimed is:

1. A method for visual communication and collaboration comprising:
    generating via a stand-alone visual communications tool hosted by an end user device a visual arrangement including an image;
    storing the visual arrangement in a computer data store coupled to the end user device;
    publishing the visual arrangement to one or more recipients over a data communications network, wherein the publishing invokes an electronic mail application coupled to the visual communications tool for transmitting the visual arrangement to a one or more recipients;
    receiving by a server the transmitted visual arrangement and forwarding by the server copies of the visual arrangement to the one or more recipients;
    transmitting by a particular one of the one or more recipients to the end user device a comment and an identifier associated with a portion of the visual arrangement in response to receipt of the visual arrangement forwarded by the server, wherein the comment and identifier are transmitted by the particular recipient without also transmitting a copy of the received visual arrangement;
    receiving by the visual communications tool the comment and the identifier and automatically correlating, without user intervention, the comment to the portion of the visual arrangement based on the identifier; and invoking the visual communications tool for displaying the portion of the visual arrangement with the correlated comment.

2. The method of claim 1, wherein the comment is a text comment transmitted by a remote computer.

3. The method of claim 1, wherein the data communication network is the Internet.

4. The method of claim 1 further comprising:
receiving the comment in an inbox provided by the electronic mail application;
displaying a notification of the received comment in the inbox.

5. The method of claim 1, wherein the portion of the visual arrangement is the image included in the visual arrangement.

6. The method of claim 1, wherein the portion of the visual arrangement is displayed on a first display area, and the comment is concurrently displayed on a second display area.

7. The method of claim 6 further comprising:
tracking all received comments on the second display area.

8. The method of claim 1 further comprising:
prompting user entry of a description of the image;
displaying the image in a first display area; and
concurrently displaying the description in a second display area.

9. The method of claim 8, wherein the visual arrangement includes a plurality of images displayed on the first display area, and in response to a user navigation of image to image on the first display area, the second display area is updated with a description of a currently navigated image.

10. The method of claim 1, wherein the electronic mail application is integrated with the visual communications tool.

11. The method of claim 1, wherein the publishing includes:
generating an electronic mail message for the visual arrangement via the electronic mail application;
determining whether the visual communications tool is connected to the data communications network; and
if the visual communications tool is not connected to the data communications network, storing the electronic mail message until the connection is established and then automatically transmitting, without user intervention, the electronic mail message to the server.

12. The method of claim 1, wherein the visual arrangement is published to a plurality of the recipients, the method further comprising:
determining if the publication to the plurality of the recipients is in a public mode or a private mode;
if the publication is in the public mode, transmitting the comment by the particular recipient to all other ones of the plurality of the recipients; and
if the publication is in a private mode, transmitting the comment by the particular recipient to only the end user device.

13. A system for visual communication and collaboration comprising:
a first end user device hosting a stand-alone visual communications tool, the visual communications tool being configured to:
generate a visual arrangement including an image;
store the visual arrangement in a computer data store; and
publish the visual arrangement to one or more recipients over a data communications network, wherein the publishing invokes an electronic mail application coupled to the visual communications tool for transmitting the visual arrangement to a one or more recipients;
a server coupled to the first end user device, the server being configured to receive the transmitted visual arrangement and forward copies of the visual arrangement to the one or more recipients; and
a second end user device coupled to the server, the second end user device being configured to:
receive the copy of the visual arrangement forwarded by the server; and
transmit to the first end user device a comment and an identifier associated with a portion of the visual arrangement in response to receipt of the forwarded visual arrangement, wherein the second end user device transmits the comment and the identifier without also transmitting a copy of the received visual arrangement,
wherein the visual communications tool is further configured to:
receive the comment and the identifier transmitted by the second end user device and automatically correlate, without user intervention, the comment to the portion of the visual arrangement based on the identifier; and
display the portion of the visual arrangement with the correlated comment in response to a user command.

14. The system of claim 13, wherein the comment is a text comment.

15. The system of claim 13, wherein the visual communications tool is further configured to:
import the image into the tool;
prompt for a description of the image;
display the visual arrangement including the image in a first display area; and
display the description of the image in a second display area.

16. The system of claim 15, wherein the visual communications tool is further configured to:
edit the image in the first display area.

17. The system of claim 13, wherein the electronic mail application is integrated with the visual communications tool.

18. The system of claim 13, wherein the visual communications tool is configured to:
generate an electronic mail message for the visual arrangement via the electronic mail application;
determine whether the visual communications tool is connected to the data communications network; and
if the visual communications tool is not connected to the data communications network, store the electronic mail message until the connection is established and then automatically transmit, without user intervention, the electronic mail message to the server.

* * * * *